(12) United States Patent
Brosche

(10) Patent No.: US 6,798,375 B2
(45) Date of Patent: Sep. 28, 2004

(54) RADAR DEVICE AND A METHOD FOR SUPPRESSING INTERFERENCE IN A RADAR DEVICE

(75) Inventor: Thomas Brosche, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/221,112

(22) PCT Filed: Dec. 22, 2001

(86) PCT No.: PCT/DE01/04914

§ 371 (c)(1),
(2), (4) Date: Dec. 18, 2002

(87) PCT Pub. No.: WO02/054104

PCT Pub. Date: Jul. 11, 2002

(65) Prior Publication Data

US 2003/0179131 A1 Sep. 25, 2003

(30) Foreign Application Priority Data

Jan. 8, 2001  (DE) .......................... 101 00 416

(51) Int. Cl.[7] .......................... G01S 7/28; G01S 13/26; G01S 7/36
(52) U.S. Cl. .......................... 342/159; 342/18; 342/202; 342/203
(58) Field of Search .............................. 342/18, 19, 20, 342/27, 70, 159, 162, 189, 202, 203

(56) References Cited

U.S. PATENT DOCUMENTS

| 4,115,772 | A | | 9/1978 | Valdes |
| 5,291,202 | A | | 3/1994 | Mc Clintock |
| 5,337,052 | A | * | 8/1994 | Lohrmann et al. ............ 342/68 |
| 5,583,512 | A | | 12/1996 | Mc Eligot |
| 5,757,312 | A | * | 5/1998 | Szmurlo et al. ............ 342/159 |
| 5,892,477 | A | * | 4/1999 | Wehling ...................... 342/18 |
| 6,069,581 | A | | 5/2000 | Li et al. |
| 6,236,352 | B1 | * | 5/2001 | Walmsley ................... 342/118 |

FOREIGN PATENT DOCUMENTS

DE     199 63 005     6/2001

* cited by examiner

Primary Examiner—Ian J. Lobo
(74) Attorney, Agent, or Firm—Kenyon & Kenyon

(57) ABSTRACT

A radar device includes elements for generating a carrier signal having a carrier frequency $f_T$, elements for generating pulses with a pulse repetition frequency $f_{PW}$, elements for distributing the carrier signal to a transmission branch and a receiving branch, elements for modulate the carrier signal in the transmission path using the undelayed pulses, elements for modulating the carrier signal in the receiving branch using the delayed pulses and for generating a reference signal, elements for mixing the reference signal in the receiving branch with a received signal and elements for integrating the mixed signal. Elements are provided for binary phase shift keying (BPSK) modulation of the carrier signal and elements are provided for switching the polarity of the received signal. A method for suppressing interference in a radar device is also described.

19 Claims, 8 Drawing Sheets

RADAR DEVICE AND A METHOD FOR SUPPRESSING INTERFERENCE IN A RADAR DEVICE

FIELD OF THE INVENTION

The present invention relates to a radar device including means for generating a carrier signal with a carrier frequency $f_T$, means for generating pulses with a pulse repetition frequency $f_{PW}$, means for distributing the carrier signal to a transmission branch and a receiving branch, means for delaying the pulses, means for modulating the carrier signal in the transmission branch using the delayed pulses and for generating a reference signal, means for mixing the reference signal in the receiving branch with a received signal, and means for integrating the mixed signal. The present invention also relates to a method of suppressing the interference in a radar device including the steps: generating a carrier signal having a carrier frequency $f_T$, generating pulses having a pulse repetition frequency $f_{PW}$, distributing the carrier signal to a transmission branch and a receiving branch, generating the pulses, modulating the carrier signal in the transmission branch using the undelayed pulses, modulating the carrier signal in the receiving branch using the delayed pulses and generating a reference signal, mixing the reference signal in the receiving branch with a received signal, and integrating the mixed received signal.

BACKGROUND INFORMATION

Radar devices and methods according to the related art are used, for example, in short-range sensing systems in motor vehicles. They are used, for example, to prevent accidents or to detect objects in a blind spot of a motor vehicle.

FIG. 1 shows a schematic view of the basic structure of a radar device of the related art. A local oscillator (LO) 110 generates a carrier frequency $f_T$. This carrier frequency is distributed by a power divider 116 to a transmission branch and a receiving branch. In addition to carrier frequency $f_T$, a pulse generator 112 provides a pulse repetition frequency $f_{PW}$ to modulate the carrier frequency. In the transmission branch, this modulation occurs using switch 120, to which the carrier frequency is applied and which is switched with the pulse repetition frequency. The signal thus generated is emitted by a transmitting antenna 136. A modulation also occurs in the receiving branch. However, the pulses of the pulse repetition frequency are delayed by a delaying device 118 for the purpose of this modulation. These delayed pulses are used to modulate carrier frequency $f_T$ by operating switch 122, to which the carrier frequency is also applied. In this way, a reference signal $S_R$ is made available in the receiving branch. This reference signal is mixed in a mixer 124 with a received signal received via receiving antenna 134. The output signal of mixer 124 is supplied to an integrating means 126, for example, a low-pass filter and an amplifier. The signal thus generated is supplied to a signal analyzer and controller 138, preferably after analog/digital conversion. Signal analyzer and controller 138 now determines the delay of delaying device 118, which is varied between a value $\Delta t_{min}$ and $\Delta t_{max}$. For example, the delay may be varied by a microcontroller or by a digital signal processor. It is also conceivable that special hardware is used for this purpose. If the transit time of the radar pulses, which as a rule is equal to twice the transit time between the target and antenna, is identical to the delay, the amplitude of the output signal of mixer 126 is at its maximum. A correlation receiver is thus available via which the distance to the target and the radial speed between the target and antenna may be inferred from the delay set by controller 138. By way of example, FIG. 1 shows only the formation of the in-phase (I) signal. The quadrature (Q) signal is formed in an analogous manner by mixing with the carrier frequency, which is 90° out of phase.

It is basically desirable to suppress interference signals originating from highly varied sources. The use of additional modulation of the microwave signal to separate the signal components reflected by the targets from interference signals has already been described. Such methods in particular suppress interference by other uncoded transmitters, broadcast transmitters for example, or noise.

However, radar devices are also subject to noise resulting from parasitic effects which are essentially independent of the effect of other radar sensors. Thus, for example, switches 120, 122 in FIG. 1 have in reality a finite ratio between the resistances in the off or on condition $R_{off}/R_{on}$. In addition, undesirable emissions or bridging of the carrier frequency arise from the local oscillator, for example, to the reference input of the mixer. This means that an approximately continuous leakage signal having the carrier frequency and low amplitude is transmitted in the transmission pauses between the radar pulses. This leakage signal in particular is also present irrespective of the delay set in the reference branch and is mixed with the received signal. As a result of this and other parasitic effects, an interference signal is received in addition from targets located outside the distance range (range gate) momentarily set by the delay in the reference signal. If such "undesirable" targets have a large backscattering cross-section or they are within short range of the sensor, then the interference signal amplitude may be on the order of magnitude of the desired signal amplitude or exceed it and consequently result in measurement errors.

It is possible to improve the $R_{off}/R_{on}$ ratio and accordingly reduce the interference signal amplitude by using, for example, several switches linked in series. However, this increases the technical complexity and consequently the costs.

SUMMARY OF THE INVENTION

According to a first embodiment, the present invention builds on a radar device of the related art by providing means for binary phase shift keying (BPSK) modulation of the carrier signal. BPSK modulation of the carrier signal may be used to integrate interference signals with constantly alternating signs in the subsequent integration while the desired signal is integrated with a constant sign. The interference signals are suppressed in this manner.

According to a second embodiment, the present invention builds on a radar device of the related art by providing means to switch the polarity of the received signal. In this manner, the subsequent integration suppresses the interference signals to a great extent while the desired signals are further processed.

Preferably, means are provided for BPSK modulation of the carrier signal in the transmission branch. In this variant, the carrier signal in the receiving branch may be supplied to the mixer as a reference signal without BPSK modulation. However, modulation takes place in the receiving branch so that the information necessary for the interference signal suppression is present there.

However, it may also be advantageous to provide means for BPSK modulation of the carrier signal in the receiving branch. In this case, a BPSK-modulated carrier signal is used as a reference signal while the transmitted signal is transmitted unmodulated. The information necessary for the interference signal suppression is contained in the carrier signal in the receiving branch.

It is useful in particular if the BPSK modulation results in a switchover of the phase angle for half a period $T_{PW}$ of pulse repetition frequency $f_{PW}$. In this way, the phase of the modulated carrier signal is switched between 0° and 180° after each half period. This periodic switchover of the phase angle advantageously ensures that the interference signals are integrated with a constantly alternating sign while the desired signal is integrated with a constant sign. Referring to two periods in each case, a pulse is generated in the transmission branch in each of the first and second half periods $T_{PW}$ and in the receiving branch in each of the first and fourth half periods. The process is repeated after every two periods.

For effective interference signal suppression, it is advantageous in particular if the mixed signal is integrated over 2n periods $T_{PW}$ of pulse repetition frequency $f_{PW}$, n being an integer equal to 1, 2, 3, . . . . This ensures that the interference signals are integrated alternately and accordingly suppressed.

It is useful if the ratio between carrier frequency $f_T$ and pulse repetition frequency $f_{PW}$ is an integer. This may be attained by dividing the carrier frequency by an integer. Another possibility for having the ratio as an integer is to generate the carrier frequency by multiplying an oscillator frequency with an integer and to generate the pulse repetition frequency by dividing the same oscillator frequency by an integer. The ratio between the carrier frequency and the pulse repetition frequency being an integer provides an effective interference signal suppression since the start and end of the pulse always coincide with a defined phase angle of the carrier signal.

It may also be advantageous to provide means for the BPSK modulation of the carrier signal in the transmission branch and in the receiving branch, to switch the phase angle in the receiving branch as a result of the BPSK modulation for a period $T_{PW}$ of pulse repetition frequency fPW and to switch the phase angle in the transmission branch as a result of the BPSK modulation in every second pulse period of pulse repetition frequency $f_{PW}$ and in the transmission and receiving branch for the length τ of each pulse. This makes it possible to suppress even external interference signals in addition to the interference signals based on parasitic effects.

Furthermore, it may be useful if switching means are provided to switch the polarity of the received signal. Such hardware-based polarity switching is suitable for ensuring the integration of the interference signal with an alternating sign.

However, it may also be useful if the polarity of the received signal is switched digitally. Such digital and preferably program-controlled polarity switching after analog/digital conversion reduces the hardware complexity. The integration in this case is expediently digital, for example by decimation, i.e., low-pass filtering and subsequent reduction of the sampling rate. In this case, an external low-pass is used to suppress aliasing. However, with this digital method, the I signal or the Q signal must be sampled at a high bandwidth B (B>$f_{PW}$) and a correspondingly high sampling frequency and further processed digitally. This in turn requires additional hardware complexity.

According to a first embodiment, the present invention builds on the method of the related art in that binary phase shift keying (BPSK) modulation of the carrier signal occurs. BPSK modulation of the carrier signal may be used to integrate interference signals with a constantly alternating sign in the subsequent integration while the desired signal is integrated with a constant sign. The interference signals are suppressed in this manner.

According to a second embodiment, the present invention builds on the method of the related art in that the polarity of the received signal is reversed. In this manner, the subsequent integration suppresses the interference signals to a great extent while the desired signals are further processed.

Preferably, a BPSK modulation of the carrier signal occurs in the transmission branch. In this variant, the carrier signal in the receiving branch may be supplied to the mixer as a reference signal without BPSK modulation. However, a modulation takes place in the transmission branch so that the information necessary for the interference signal suppression is present there.

However, it may also be advantageous that a BPSK modulation of the carrier signal occurs in the receiving branch. In this case, a BPSK-modulated carrier signal is used as a reference signal while the transmitted signal is transmitted unmodulated. The information necessary for interference signal suppression is contained in the carrier signal in the receiving branch.

It may also be useful if the BPSK modulation results in a switchover of the phase angle for half a period $T_{PW}$ of pulse repetition frequency $f_{PW}$. In this way, the phase of the modulated carrier signal is switched between 0° and 180° after each half period. This periodic switchover of the phase angle advantageously ensures that the interference signals are integrated with a constantly alternating sign while the desired signal is integrated with a constant sign.

Preferably, the mixed signal is integrated over 2n periods $T_{PW}$, n being an integer equal to 1, 2, 3, . . . of pulse repetition frequency $f_{PW}$. This ensures that the interference signals are integrated alternately and thus suppressed.

It is useful that the ratio between carrier frequency $f_T$ and pulse repetition frequency $f_{PW}$ is an integer. This may be attained by dividing the carrier frequency by an integer. Another possibility for having an integer ratio is to generate the carrier frequency by multiplying an oscillator frequency with an integer and to generate the pulse repetition frequency by dividing the same oscillator frequency by an integer. The ratio between the carrier frequency and the pulse repetition frequency being an integer provides an effective interference signal suppression since the start and end of the pulse always coincide with a defined phase angle of the carrier signal.

Also, it may be advantageous if a BPSK modulation of the carrier signal occurs in the transmission branch and in the receiving branch, if the phase angle is switched in the receiving branch as a result of the BPSK modulation for a period of pulse repetition frequency $f_{PW}$ and if the phase angle is switched in the transmission branch as a result of the BPSK modulation in every second pulse period of pulse repetition frequency $f_{PW}$ and in the transmission and receiving branch for the length τ of each pulse. This makes it possible to suppress even external interference signals in addition to the interference signals based on parasitic effects. In this embodiment, one pulse is generated in the transmission branch and one in the receiving branch in each period $T_{PW}$ of pulse repetition frequency $f_{PW}$.

Preferably the polarity of the received signal is switched by switching means. Such hardware-based polarity switching is suitable to ensure the integration of the interference signal with an alternating sign.

It may also be advantageous if the polarity of the received signal is switched digitally. Such digital and preferably program-controlled polarity switching after analog/digital conversion reduces the hardware complexity. Integration in this case is expediently digital, for example by decimation, i.e., low-pass filtering and subsequent reduction of the sampling rate. In this case, an external low-pass is used to suppress aliasing. However, with this digital method, the I signal or the Q signal must be sampled at a high bandwidth B (B>$f_{PW}$) and a correspondingly high sampling frequency and further processed digitally. This in turn requires additional hardware complexity.

The present invention is based on the surprising knowledge that it is possible to suppress interference by parasitic effects in radar devices actually constructed with relatively little technical complexity. The use of a BPSK modulation or switching the polarity of the received signal makes it possible to integrate the interference signals with constantly alternating signs while the desired signal is integrated with a constant sign. As an advantageous embodiment in particular, it should be mentioned that it is not only possible to suppress interference caused by parasitic effects in both the transmission branch and the receiving branch, but rather it is also possible to suppress external interference signals.

DETAILED DESCRIPTION

Figure 1:
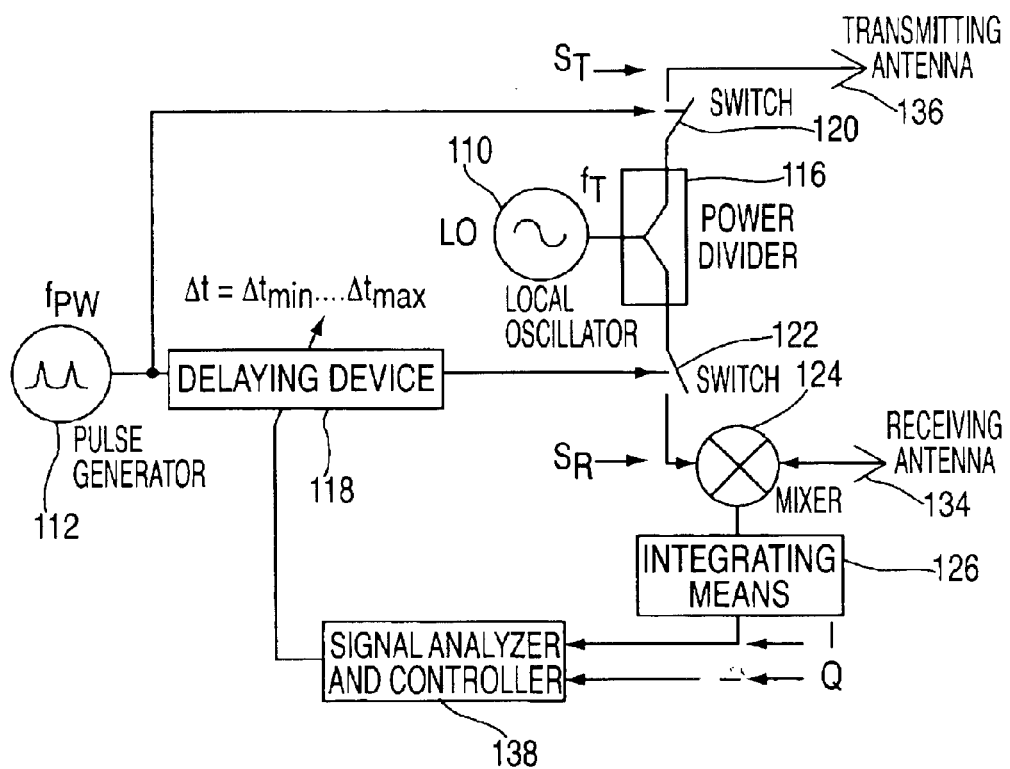
FIG. 1 shows a schematic representation of a radar device of the related art.
Figure 2:
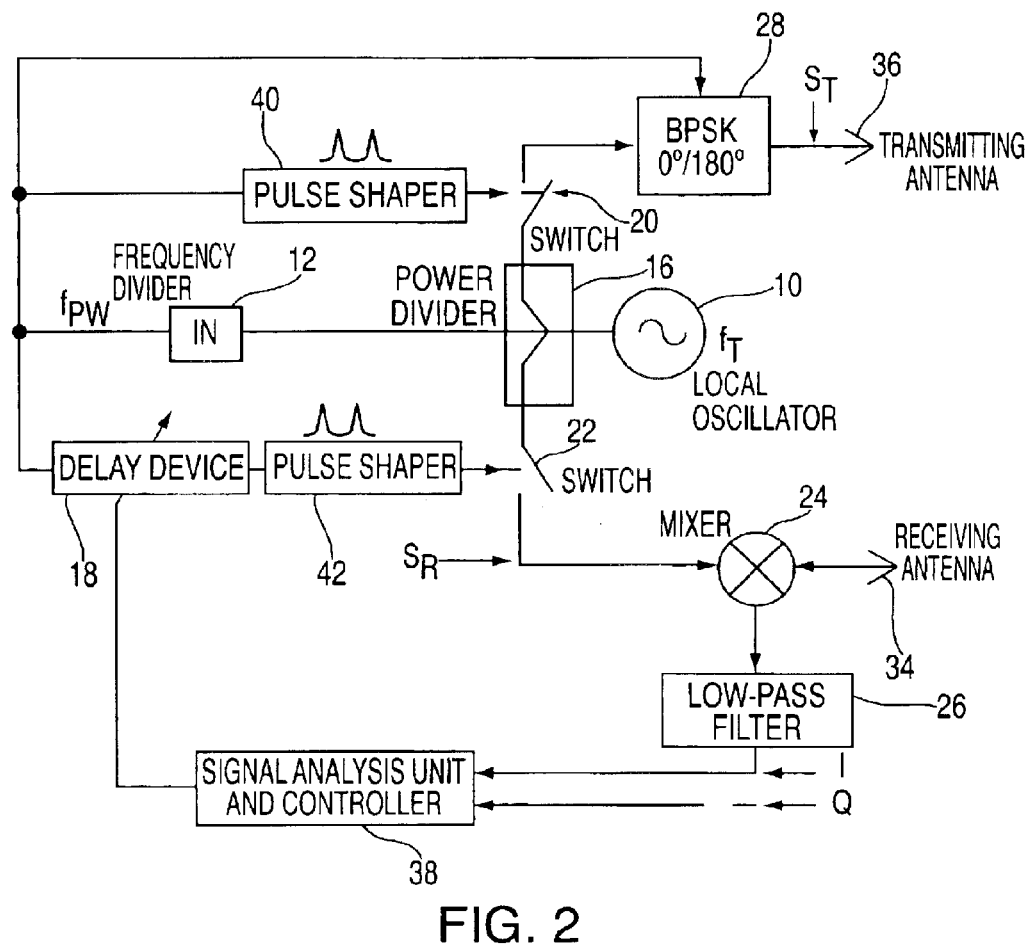
FIG. 2 shows a schematic representation of a radar device according to the present invention.

FIG. 2 shows a schematic representation of a radar device according to the present invention. A local oscillator 10 is connected to a power divider 16. This power divider 16 is connected to a transmission branch. One portion of the power of local oscillator 10 is decoupled by power divider 16 into the receiving branch. In addition, local oscillator 10 is connected to a frequency divider 12. Frequency divider 12 reduces carrier frequency $f_T$ of local oscillator 10 by the factor N. This reduced frequency is supplied to a pulse shaper 40 and a delay device 18. This pulse shaper 40 operates a switch 20 in the transmission branch to modulate the carrier signal. The delayed output signal of delay device 18 is sent to a pulse shaper 42. This pulse shaper 42 generates pulses with which the carrier signal in the receiving branch is modulated using switch 22. A reference signal $S_R$ is generated in this manner. Thus signals are present in both the transmission branch and in the receiving branch that are modulated with the pulses of the respective pulse shapers 40, 42. The signal in the transmission branch is subsequently supplied to a BPSK modulation 28, which switches the transmitted signal between 0° and 180°. This switchover between 0° and 180° occurs within half a period, which corresponds to period length $T_{PW}$ of doubled pulse repetition frequency $F_{PW}$. This is accomplished in that BPSK modulation 28 is controlled by an output signal of frequency divider 12. In this manner, the phase is switched after every half period of pulse repetition frequency $f_{PW}$. The BPSK signal thus modulated is transmitted by transmitting antenna 36 and received by receiving antenna 34 after being reflected by a target. The signal received by receiving antenna 34 is supplied to a mixer 24 where it is mixed with reference signal $S_R$. The output signal of mixer 24 is integrated and amplified in a low-pass filter 26. The output signal of low-pass filter 26 is sent to a signal analysis unit and controller 38. Controller 38 sets the delay of delay device 18. The result of the periodic switchover of the phase angle is that the corresponding interference signal is integrated with a constantly alternating sign and the interference signal is thus minimized. However, the desired signal is integrated with a constant sign. For effective interference signal suppression, it is also necessary that the carrier frequency $f_T$ to pulse repetition frequency $f_{PW}$ ratio be an integer: N=$f_T$/$f_{PW}$. This may be accomplished, as shown, by dividing the carrier frequency by the factor N or by multiplying an oscillator frequency $f_O$ with $f_T$=$N_1 f_O$ and dividing $f_{PW}$=$f_O$/$N_2$ by $N_1 N_2$=N and $N_2$=1, 2, ... (not shown). The formation of the in-phase (I) signal is shown in FIG. 2. The quadrature (Q) signal is formed by analogy by mixing with carrier frequency $f_T$, which has been phase shifted by 90°.

Figure 3:
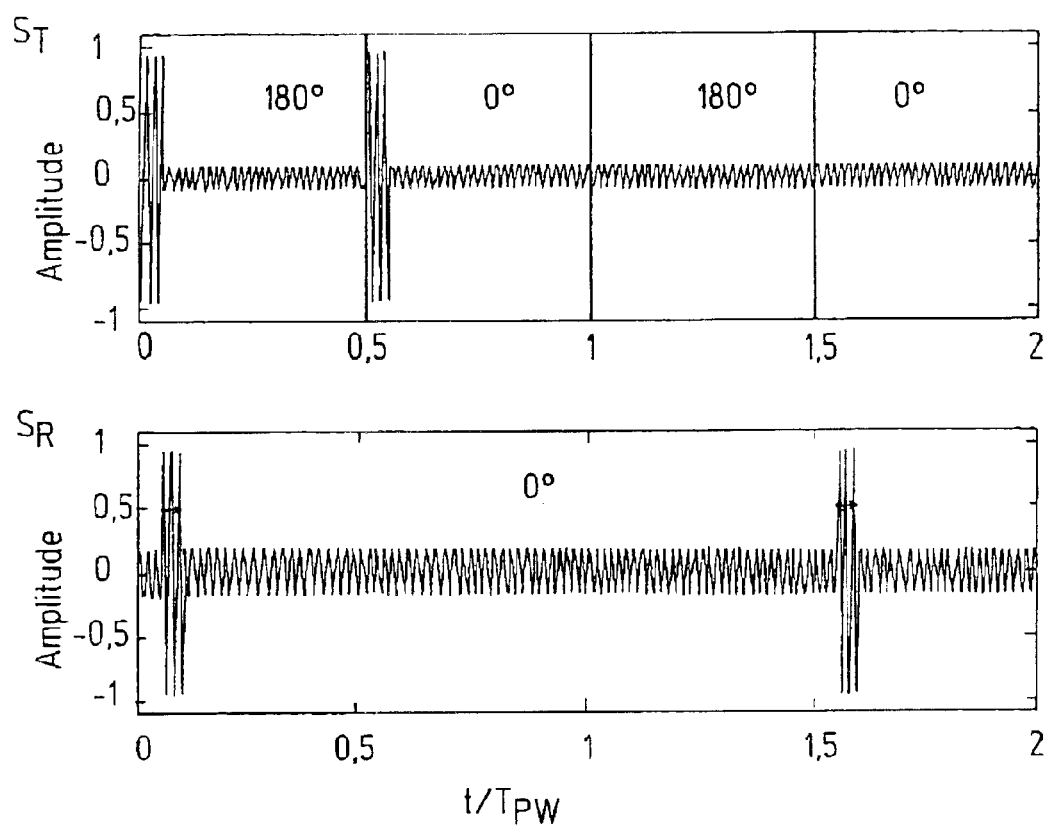
FIG. 3 shows graphic representations of the amplitudes of transmitted and received signals of the radar device according to FIG. 2.

The amplitude of transmitted signal $S_T$ is shown over two periods $T_{PW}$ of pulse repetition frequency $f_{PW}$ in the upper portion of FIG. 3. Reference signal $S_R$ is shown over the same time span in the lower portion of FIG. 3. FIG. 3 shows the signal relationships that occur in a circuit according to FIG. 2, i.e., with a BPSK modulation in the transmission branch. It may be seen that the transmitted signal is switched over after every period $T_{PW}$ of pulse repetition frequency $f_{PW}$. The delayed received signal is not phase-modulated.

Figure 4:
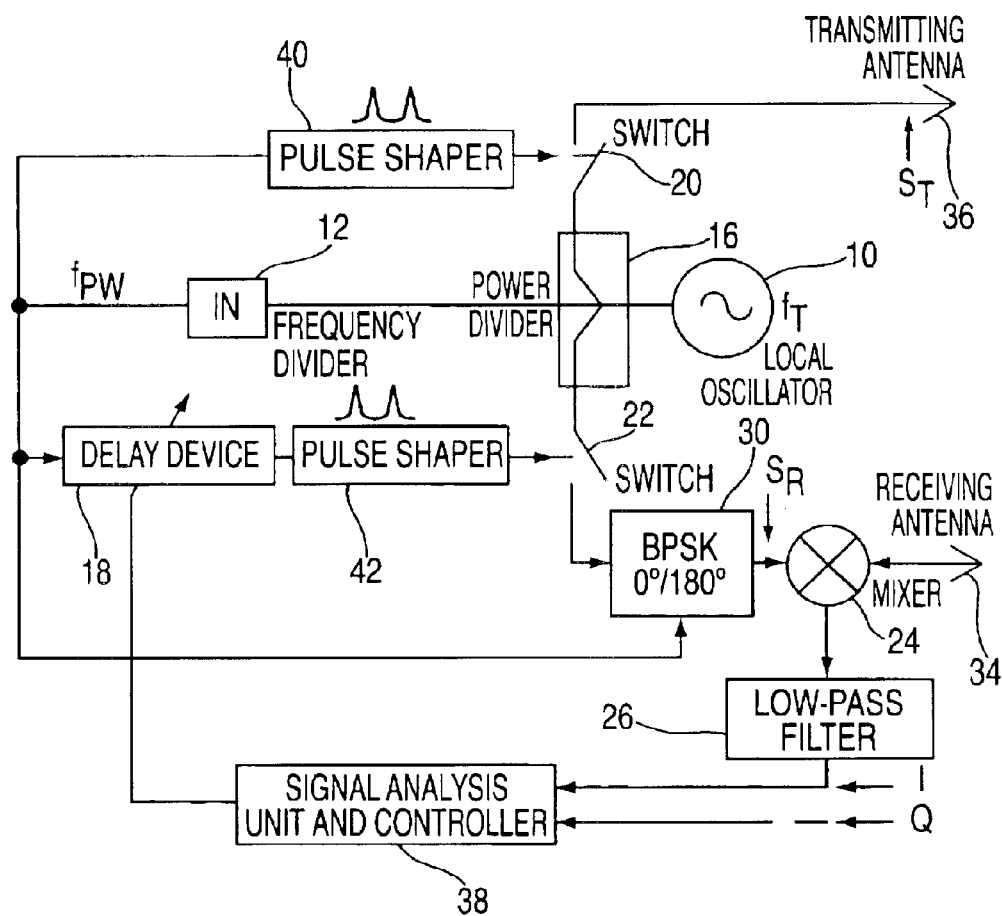
FIG. 4 shows a schematic representation of a radar device according to the present invention.

Another radar device is again illustrated by way of example in FIG. 4 using the in-phase (I) signal. In this case also, the quadrature (Q) signal is formed in an analogous manner by mixing with carrier frequency $f_T$, which is phase-shifted by 90°. Components corresponding to the same components in FIG. 2 are identified by the same reference symbols. In contrast to FIG. 2, the receiving branch is BPSK-modulated in the radar device according to FIG. 4. However, the transmitted signals are transmitted by transmitting antenna 36 without prior BPSK modulation. The BPSK modulation in the receiving branch generates a BPSK-modulated reference signal $S_R$ which is mixed with the received signal in mixer 24.

Figure 5:
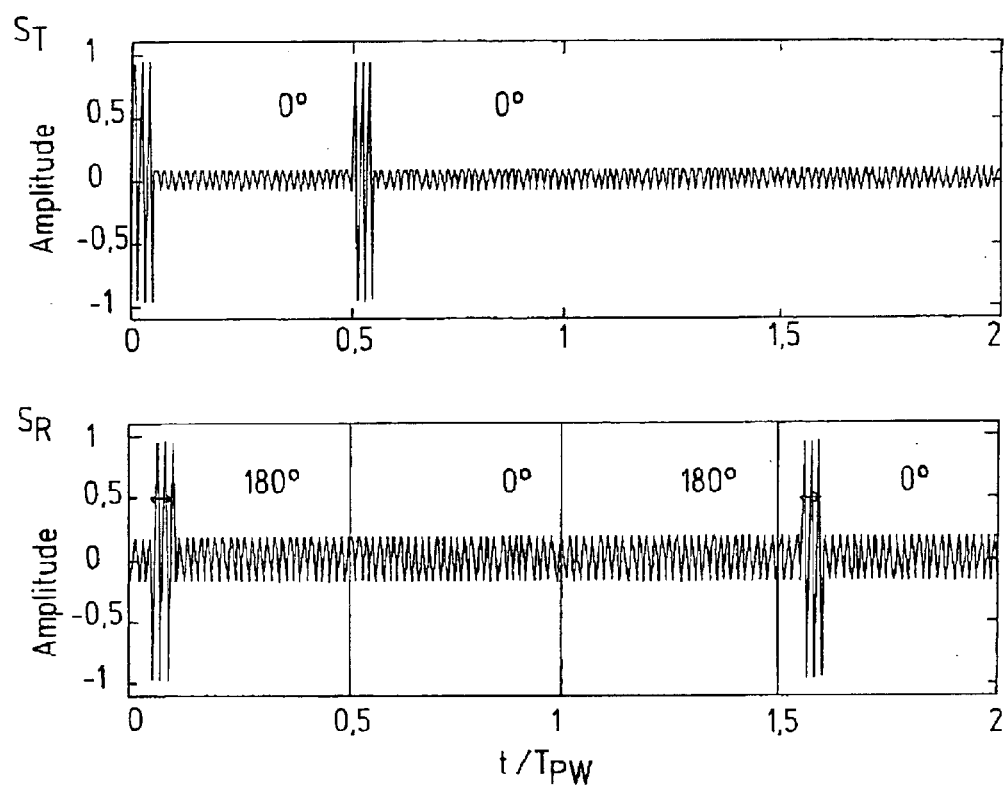
FIG. 5 shows schematic representations of the amplitudes of transmitted and received signals of the radar device according to FIG. 4.

The waveform of the signals that occur in a circuit according to FIG. 4 is shown graphically in FIG. 5. Transmitted signal $S_T$ is plotted in the upper portion of FIG. 5. Reference signal $S_R$ is shown in the lower portion of FIG. 5. Based on FIG. 5, it may be seen that the transmitted signal is not phase-modulated. The phase of the delayed received signal is switched over after each half period $T_{PW}$ of the pulse repetition frequency.

Figure 6:
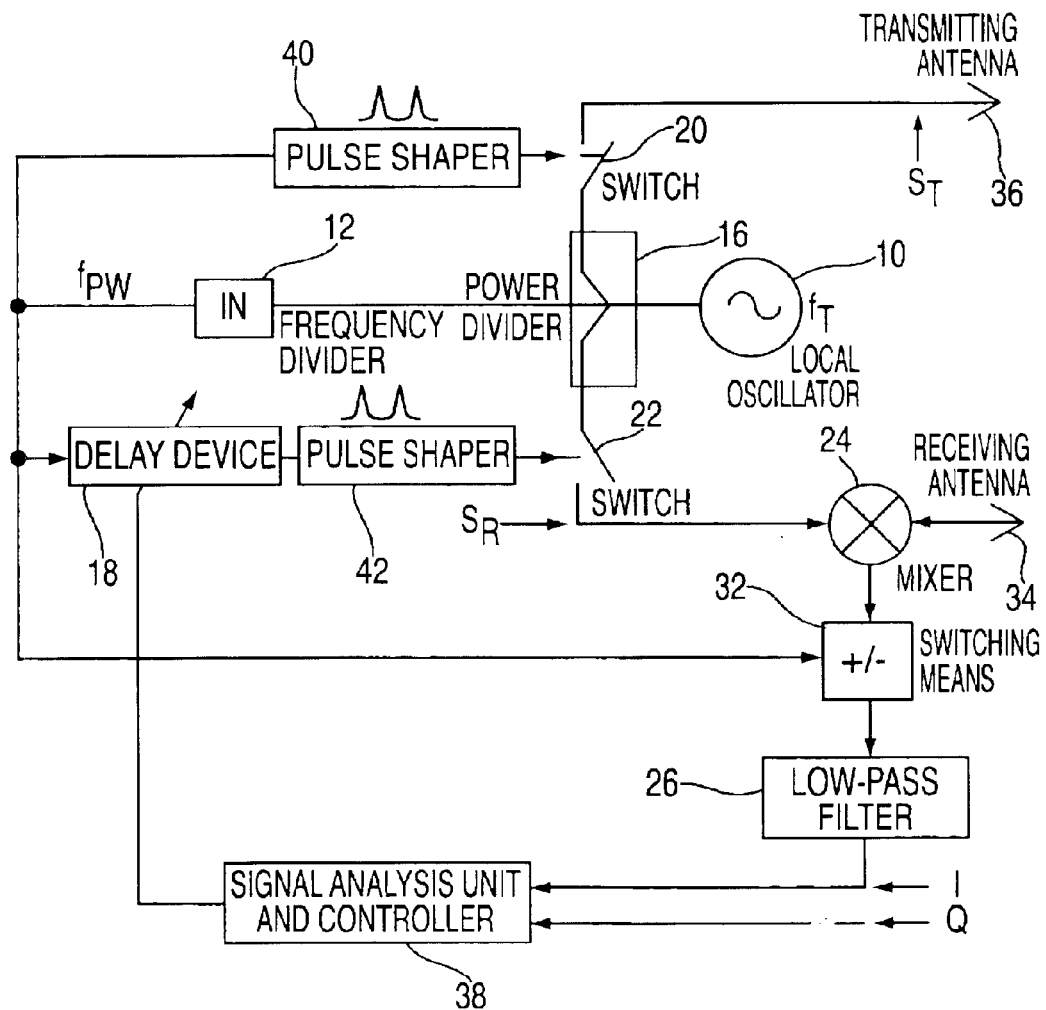
FIG. 6 shows a schematic representation of a radar device according to the present invention.

Another embodiment of a radar device of the present invention is shown in FIG. 6. Again, components that correspond to those of FIG. 2 are identified with the same reference symbols. The special feature in FIG. 6 is that means 32 are provided instead of BPSK modulation for switching the polarity of the received signal. This also makes it possible to suppress the interference based on the subsequent integration since the interference is integrated with an alternating sign while the desired signals are always integrated with the same sign.

Figure 7:
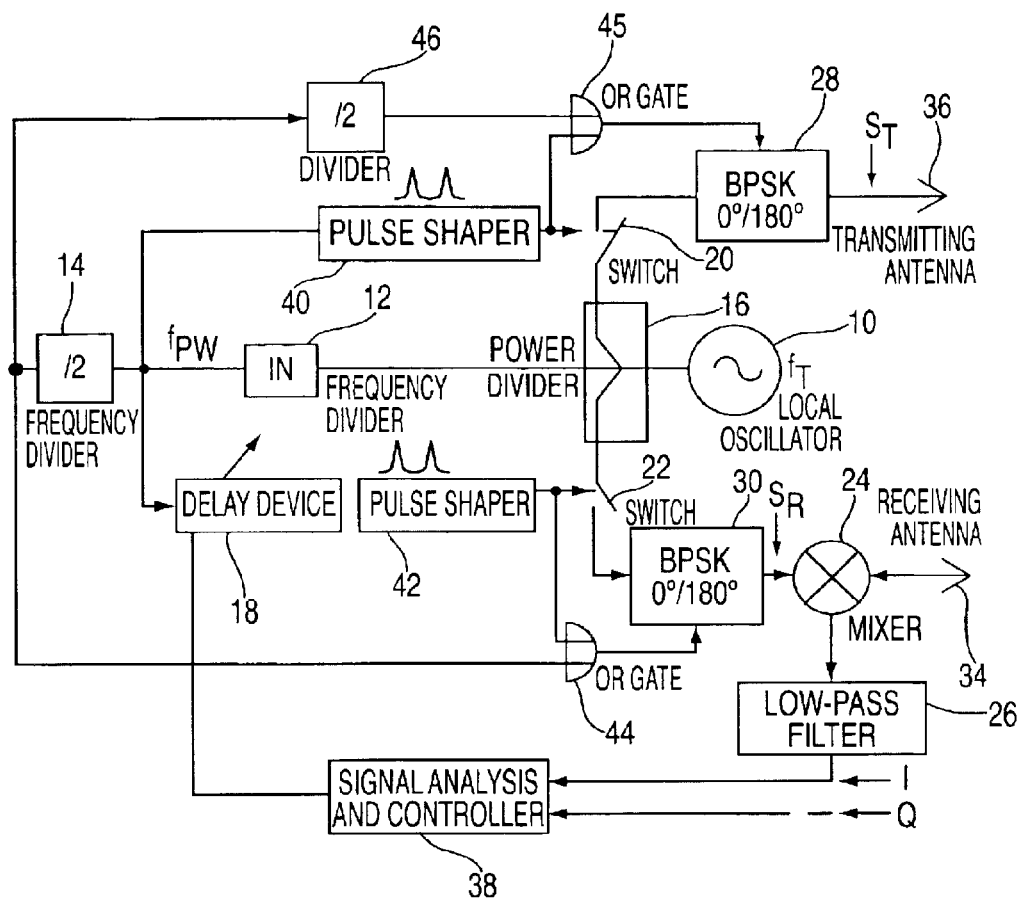
FIG. 7 shows a schematic representation of a radar device according to the present invention.

An additional embodiment of a radar device of the present invention is shown schematically in FIG. 7. In this case, both the transmission branch as well as the receiving branch are provided with BPSK modulation 28, 30. BPSK modulation 30 occurs in the receiving branch as a function of the output signal of an OR gate 44. Input signals of this OR gate 44 are the delayed pulses as well as pulse repetition frequency $f_{PW}$ divided by two. In this manner, the phase modulation in the receiving branch occurs during length τ of the pulses and in every second pulse period $T_{PW}$ of the pulse repetition frequency. This, however, requires greater hardware complexity.

BPSK modulation 28 in the transmission branch occurs as a function of an additional OR gate 45. Input signals of this OR gate 45 are the pulses from pulse shaper 40 and pulse repetition frequency $f_{PW}$ divided by four at the output of an additional divider 46. The phase modulation thus occurs during length τ of the pulses and for the length of two periods each of pulse repetition frequency $f_{PW}$ in the third and fourth periods of four periods. After every four periods, the modulation pattern just described is repeated in a similar manner.

Figure 8:
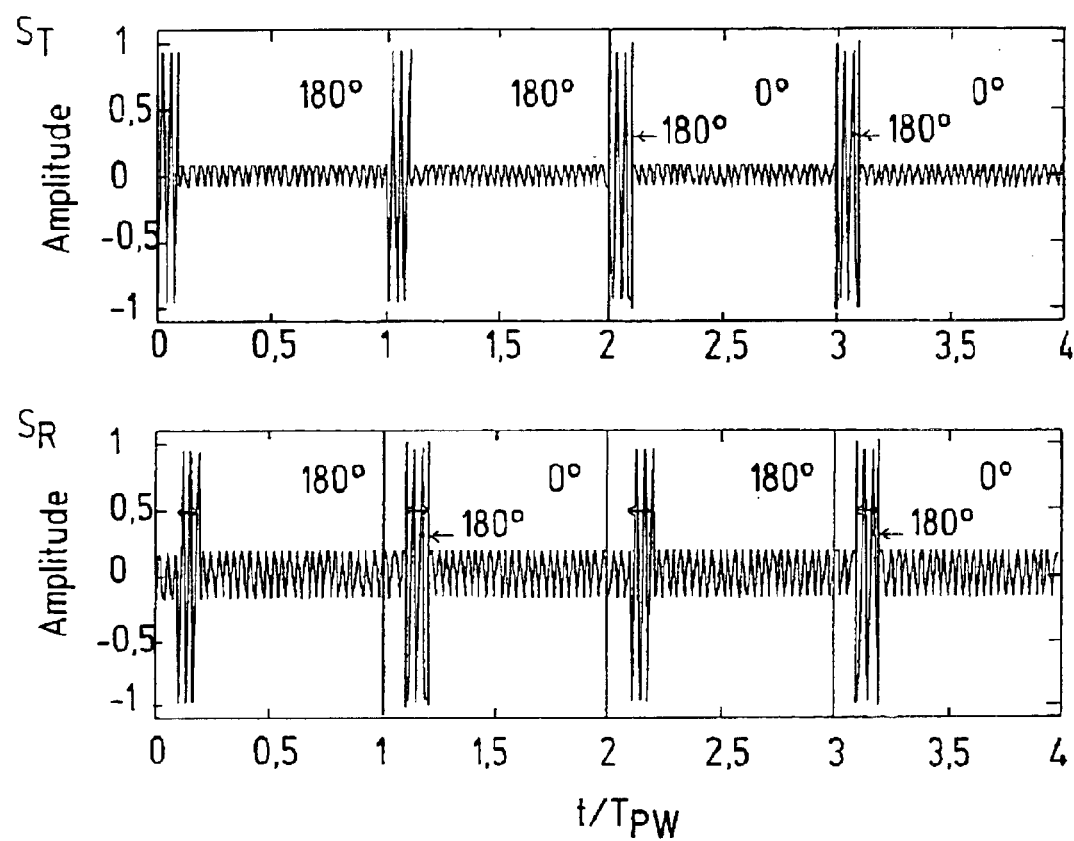
FIG. 8 shows schematic representations of the amplitudes of transmitted and received signals of the radar device according to FIG. 7.

The signals that occur in a radar device of the present invention according to FIG. 7 are shown in FIG. 8. Transmitted signal $S_T$ is again shown in the upper portion of FIG. 8. Reference signal $S_R$ is shown in the lower part. It may be seen that the phase of the transmitted signal is switched over after every second period $T_{PW}$ of the pulse repetition frequency and during length τ of each pulse. The phase of the reference signal is, however, switched after each period $T_{PW}$ of the pulse repetition frequency and during length τ of each pulse.

The above description of the exemplary embodiments according to the present invention is only intended to illustrate and not to limit the present invention. Various changes and modifications are possible within the scope of the present invention without departing from the scope of the present invention and its equivalents.

What is claimed is:

1. A radar device, comprising:
    an arrangement for generating a carrier signal having a carrier frequency fT;
    an arrangement for generating pulses having a pulse repetition frequency fPW;
    an arrangement for distributing the carrier signal to a transmission branch and a receiving branch;
    an arrangement for delaying the pulses;
    an arrangement for modulating the carrier signal in the transmission branch using undelayed ones of the pulses;
    an arrangement for modulating the carrier signal in the receiving branch using delayed ones of the pulses and for generating a reference signal;
    an arrangement for mixing the reference signal in the receiving branch with a received signal to produce a mixed signal;
    an arrangement for integrating the mixed signal; and
    an arrangement for switching a polarity of the received signal.

2. The radar device as recited in claim 1, further comprising:
    an arrangement for performing a binary phase shift keying (BPSK) modulation of the carrier signal in the transmission branch.

3. The radar device as recited in claim 1, further comprising:
    an arrangement for performing a binary phase shift keying (BPSK) modulation of the carrier signal in the receiving branch.

4. The radar device as recited in claim 1, wherein:
    a phase angle is switched over by an arrangement for performing a binary phase shift keying (BPSK) modulation for half a period TPW of the pulse repetition frequency fPW.

5. The radar device as recited in claim 1, wherein:
    the mixed signal is integrated over an integral number of 2n periods TPW of the pulse repetition frequency fPW, where n=1, 2, 3, . . . .

6. The radar device as recited in claim 1, wherein:
    referring to two pulse periods TPW in each case, a process is performed in which a pulse is generated in the transmission branch in each of a first half pulse period and a second half pulse period and in the receiving branch in each of the first half pulse period and a third half pulse period, and
    the process is repeated after every two pulse periods TPW.

7. The radar device as recited in claim 1, wherein:
    a ratio of the carrier frequency fT to the pulse repetition frequency fPW is an integer.

8. The radar device as recited in claim 1, further comprising:
    an arrangement for performing a binary phase shift keying (BPSK) modulation of the carrier signal in the transmission branch and in the receiving branch, wherein:
        a phase angle is switched in the transmission branch as a result of the BPSK modulation for two periods TPW each of the pulse repetition frequency fPW and during a length of each pulse, and
        the phase angle is switched in the receiving branch as a result of the BPSK modulation in every pulse period of the pulse repetition frequency fPW and during the length of each pulse.

9. The radar device as recited in claim 1, wherein:
    the mixed signal is integrated over an integral number of 4n periods TPW of pulse repetition frequency fPW, where n=1, 2, 3, . . . .

10. The radar device as recited in claim 1, wherein:
    one pulse each is generated in the transmission branch and the receiving branch in each pulse period TPW.

11. The radar device as recited in claim 1, wherein:
    the polarity of the received signal is switched digitally.

12. A method for suppressing interference in a radar device, comprising:
    generating a carrier signal having a carrier frequency fT;
    generating pulses having a pulse repetition frequency fPW;
    distributing the carrier signal to a transmission branch and a receiving branch;
    delaying the pulses;
    modulating the carrier signal in the transmission branch using undelayed ones of the pulses;
    modulating the carrier signal in the receiving branch using delayed ones of the pulses;
    generating a reference signal;
    mixing the reference signal in the receiving branch with a received signal;
    integrating the mixed signal; and
    switching over a polarity of the received signal.

13. The method as recited in claim 12, further comprising:
performing a binary phase shift keying (BPSK) modulation of the carrier signal in the transmission branch.

14. The method as recited in claim 12, further comprising:
performing a binary phase shift keying (BPSK) modulation of the carrier signal in the receiving branch.

15. The method as recited in claim 12, further comprising:
switching over a phase angle by performing a binary phase shift keying (BPSK) modulation of the carrier signal for half a period TPW of pulse repetition frequency fPW.

16. The method as recited in claim 12, further comprising:
integrating the mixed signal over an integral number of 2n periods TPW of pulse repetition frequency fPW, where n=to 1, 2, 3, . . . .

17. The method as recited in claim 12, wherein:
a ratio of the carrier frequency fT to the pulse repetition frequency fPW is an integer.

18. The method as recited in claim 12, further comprising:
performing a binary phase shift keying (BPSK) modulation of the carrier signal in the transmission branch and in the receiving branch, wherein a phase angle is switched in the transmission branch as a result of the BPSK modulation for two periods of the pulse repetition frequency fPW and during a length of each pulse, and the phase angle is switched in the receiving branch as a result of the BPSK modulation in every second pulse period of the pulse repetition frequency fPW and during the length of each pulse.

19. The method as recited in claim 12, wherein:
the polarity of the received signal is switched over digitally.

* * * * *